UNITED STATES PATENT OFFICE 2,110,629

NITRO-DERIVATIVES OF 2-HYDROXYNAPH-THALENE-3-CARBOXYLIC ACID AND A PROCESS FOR PREPARING THEM

Wilhelm Luce, Hofheim-in-the-Taunus, Germany, assignor to General Aniline Works, Inc., New York, N. Y., a corporation of Delaware No Drawing. Application May 9, 1934, Serial No. 724,826. In Germany May 13, 1933

8 Claims. (Cl. 260—110)

The present invention relates to nitro-derivatives of 2-hydroxynaphthalene-3-carboxylic acid and its functional derivatives capable of being combined with diazo compounds and to a process of preparing them; more particularly it relates to compounds corresponding to the following general formula:

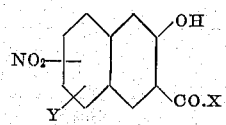

wherein X stands for hydroxy, alkoxy or amino and Y for hydrogen, alkoxy, alkyl, halogen, phenylamino, sulfonic acid or dimethylaminosulfonyl groups, As is known, by nitrating 2-hydroxynaphthalene-3-carboxylic acid there are obtained according to the experimental conditions 1-nitro-2-hydroxynaphthalene-3-carboxylic acid or 1.6-dinitro-2-hydroxynaphthalene - 3 - carboxylic acid [cf. Journal für praktische Chemie, new series, vol. 48 (1893), page 534]. By nitrating 2.3-hydroxynaphthoic acid esters, the corresponding nitro-derivatives of 2.3-hydroxynaphthoic acid esters are obtained [cf. Berichte der deutschen chemischen Gesellschaft, vol. 27, (1894), page 2623].

Now, I have found that hitherto unknown well defined nitro-derivatives of 2-hydroxynaphthalene-3-carboxylic acid, capable of being combined with diazo compounds are obtainable by nitrating 2-acyl-derivatives of 2-hydroxynaphthalene-3-carboxylic acid and splitting off the acyl group, according to known methods. The conditions of nitration depend on the nature of the acyl radical and must be chosen so that the nitration occurs more rapidly than the acyl radical might be split off.

In the same manner there may be obtained nitro-derivatives capable of being combined with diazo compounds by starting from the functional derivatives of 2-hydroxy-naphthalene-3-carboxylic acid, for instance, from 2.3-hydroxynaphthoic acid esters or 2.3-hydroxynaphthoic acid amide.

By nitrating the acyl derivatives of 2-hydroxynaphthalene-3-carboxylic acid and its functional derivatives, there are generally obtained different nitro-bodies which may be converted by suitable methods of separation into uniform nitro-bodies. As a rule, however, the nitration takes place uniformly if there are used acyl-derivatives of such substitution products of 2-hydroxynaphthalene-3-carboxylic acid as contain in 5-, 6-, 7- or 8-position a substituent which exerts a directing action on the entering nitro group.

According to the present process, it is not necessary to start from isolated acyl-derivatives of 2-hydroxynaphthalene-3-carboxylic acid; in some cases it has rather proved to be useful to introduce the acyl radical and to conduct the subsequent nitration in one working operation without isolating the acyl derivatives.

The new derivatives are more or less yellow to orange colored compounds which, for the greater part, have no definite melting point but, on being heated, soften slowly and, on further heating, decompose at a certain temperature with violent evolution of gas. The compounds obtained are valuable intermediates for the preparation of dyestuffs.

The following examples serve to illustrate the invention, but they are not intended to limit it thereto; the parts are by weight unless otherwise stated.

1. 213 parts of 7-methoxy-2-hydroxynaphthalene-3-carboxylic acid are boiled in 1000 parts of acetic anhydride. The acetic acid formed is distilled off and the solution obtained is made up to the original volume by addition of acetic anhydride. 64 parts of nitric acid of 99 per cent. strength are added at 5° C., while stirring, to the solution of the acetyl compound obtained. The nitration product precipitates immediately. It is filtered with suction and saponified by boiling with 5000 parts of water and 175 parts of anhydrous sodium carbonate. The solution obtained is neutralized and precipitated with 400 parts of sodium chloride. After cooling, the separated sodium salt is filtered with suction, washed with a solution of sodium chloride of 10 per cent. strength, dissolved in water and precipitated with mineral acid.

There is obtained a feebly yellowish-colored acid which melts at 273° C. with violent decomposition and dissolves far more difficultly in alcohol than 7-methoxy-2-hydroxynaphthalene-3-carboxylic acid. When coupled with diazotized o-nitraniline in a solution rendered alkaline by means of sodium carbonate, it yields a yellowish red azo dyestuff which dissolves in concentrated sulfuric acid to a Bordeaux red solution, whereas the corresponding dyestuff from 7-methoxy-2-hydroxynaphthalene-3-carboxylic acid is red in color and dissolves in concentrated sulfuric acid to a violet solution. The sodium salt of the acid is rather difficultly soluble in water. It crystallizes from water in the form of intensely yellow-colored long needles.

The new acid represents obviously the hitherto unknown 8 - nitro-7-methoxy - 2 - hydroxynaphthalene-3-carboxylic acid of the following formula:

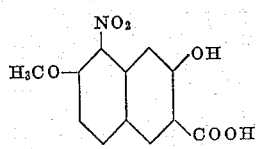

2. 218 parts of 8-methoxy-2-hydroxynaphthalene-3-carboxylic acid are dissolved, while boiling, in 2000 parts of acetic anhydride. The solution of the acetyl compound is concentrated by evaporation to about half the volume and, after cooling, a mixture from 100 parts of nitric acid of specific gravity 1.4 and 500 parts of glacial acetic acid is added thereto. The mixture is allowed to stand for 48 hours and the excess of acetic anhydride is decomposed by stirring with cold water. The nitro-body which has separated is saponified as indicated in Example 1 by boiling with a solution of sodium carbonate and purified by way of the sodium salt.

The sodium salt is easily soluble in boiling water, but very difficultly soluble in cold water. It crystallizes from water in the form of long orange-yellow needles. The free acid is yellow in color and melts with decomposition at 268° C. to 275° C. It couples in a solution rendered alkaline by means of sodium carbonate with diazotized o-nitraniline to form a yellow-red azo-dyestuff, whereas 8-methoxy - 2 - hydroxynaphthalene-3-carboxylic acid yields a Bordeaux-red dyestuff when coupled with the same diazo compound.

The new acid has probably the constitution of a 5 - nitro-8-methoxy-2-hydroxynaphthalene-3-carboxylic acid.

3. 218 parts of 6-methoxy-2-hydroxynaphthalene-3-carboxylic acid are acetylated, nitrated and saponified as indicated in Example 1. In this manner, there is obtained a yellow-colored acid which melts at 260° C. with violent decomposition and, when coupled with diazotized o-nitraniline in a solution rendered alkaline by means of sodium carbonate, it yields a bright-red azo dyestuff which dissolves in concentrated sulfuric acid to a brown-red solution, whereas the corresponding dyestuff from 6-methoxy-2-hydroxynaphthalene-3-carboxylic acid has a dull Bordeaux-red color and dissolves in concentrated sulfuric acid to a Bordeaux-red solution.

The acid obtained represents probably the hitherto unknown 5 - nitro - 6 - methoxy-2-hydroxynaphthalene-3-carboxylic acid.

In a similar manner, there may be nitrated and saponified the acyl compounds of 6-methyl-2 - hydroxynaphthalene - 3 - carboxylic acid, 6 - ethyl-2-hydroxynaphthalene-3-carboxylic acid, 6 - ethoxy - 2 - hydroxynaphthalene-3-carboxylic acid and 6-n-butyloxy-2-hydroxynaphthalene-3-carboxylic acid. There are obtained the corresponding mono-nitro-derivatives, the nitro-group of which probably stands in 5-position.

In the following table, there are described the properties of the 5-nitro derivatives obtainable in this manner:

| | |
|---|---|
| 5-nitro-6-methyl-2-hydroxy-naphthalene-3-carboxylic acid. | Crystallizing from alcohol in the form of yellow needles, decomposition point 250° C. |
| 5-nitro-6-ethyl-2-hydroxy-naphthalene-3-carboxylic acid. | Decomposition point 240° C. |
| 5-nitro-6-ethoxy-2-hydroxy-naphthalene-3-carboxylic acid. | Decomposition point 250° C., the sodium salt is considerably more difficultly soluble in water than that of 6-ethoxy-2 - hydroxynaphthalene - 3 - carboxylic acid and couples with diazotized o-nitraniline to form an orange red dyestuff, whereas 6-ethoxy-2-hydroxynaphthalene-3-carboxylic acid couples with the same diazo compound to form a brown-red dyestuff. |
| 5-nitro-6-n-butyloxy-2-hydroxynaphthalene-3-carboxylic acid. | Crystallizing from alcohol in the form of beautiful long canary felted needles which soften at 210° C. to 215° C., then decompose slowly and carbonize at about 250° C. The sodium salt dissolves in water to a lemon-yellow solution much more easily than that of 6-n-butyloxy-2-hydroxynaphthalene-3-carboxylic acid and yields, when coupled with diazotized o-nitraniline in a solution rendered alkaline by means of sodium carbonate, a clear Bordeaux-red dyestuff which becomes brick-red on addition of caustic soda solution, whereas the corresponding dyestuff from 6-n-butyloxy-2-hydroxynaphthalene-3-carboxylic acid is brownish-Bordeaux-violet and turns red brown on addition of caustic soda solution. |

4. 279 parts of 7-phenylamino-2-hydroxynaphthalene-3-carboxylic acid are dissolved, while boiling, in 2500 parts of acetic anhydride. The solution is concentrated by evaporation to about half its volume and cooled to 0° C., 126 parts of nitric acid of 99 per cent. strength are added to the solution of the acetyl compound, care being taken that the nitric acid is added so slowly that only small quantities of unacted-upon nitric acid are present and the explosive reaction between nitric acid and acetic anhydride which is otherwise liable to occur is avoided (cf. Berichte der deutschen chemischen Gesellschaft, volume 36 [1903], page 2226). After 10 hours, the whole is stirred with cold water and the nitro-body obtained is saponified by boiling with a solution of sodium carbonate. After purification by way of the difficultly soluble sodium salt, there is obtained a yellow dinitro-derivative which may be recrystallized from alcohol and melts at 275° C. with decomposition.

The new compound has probably the constitution of a 8.4'-dinitro-7-phenylamino-2-hydroxynaphthalene-3-carboxylic acid of the following formula:

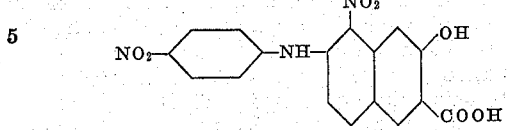

5. 188 parts of 2-hydroxynaphthalene-3-carboxylic acid are boiled for one hour with 1000 parts of acetic anhydride. The acetic acid formed is distilled off and the original volume is restored by addition of acetic anhydride. A mixture of 200 parts of phosphorus pentoxide and 150 parts of precipitated and calcined silicic acid is introduced at —10° C. to 0° C. into the solution of the acetyl compound obtained. At 0° C. to 10° C. 64 parts of nitric acid are added, while stirring, to this mixture. The rapidity with which the acid is introduced has to be regulated so that the concentration of unacted-upon nitric acid, which is liable to undergo an explosive reaction with the acetic anhydride, is always small. Therefore, the nitric acid is caused to run in so slowly that test portions frequently taken from the mixture show only small reactions when heated to 60° C.–80° C. When the nitric acid has been added and a test portion shows no considerable reaction on heating, the solution is poured on ice. The nitration product obtained is saponified by boiling with a solution of sodium carbonate, reprecipitated by acidification and purified by recrystallization from alcohol.

In this manner, there is obtained the hitherto unknown 8-nitro-2-hydroxynaphthalene-3-carboxylic acid which crystallized from alcohol in the form of yellow laminae of a decomposition point of 285° C. to 290° C. In an entirely pure state, it crystallizes from alcohol in the form of short needles of a decomposition point of 293° C. The methyl ester crystallizes from benzene in the form of yellow needles of a melting point of 206° C.–208° C., the amide crystallizes from glacial acetic acid in the form of brown-yellow needles forming characteristic clusters and melting at 275° C.–280° C. with decomposition. The 8-nitro-2-hydroxynaphthalene-3-carboxylic acid yields, when coupled with diazotized o-nitraniline in a solution rendered alkaline by means of sodium carbonate, an azo dyestuff which is considerably yellower in color than that obtainable from the same diazo compound and 2.3-hydroxynaphthoic acid. By reducing the 8-nitro-2-hydroxynaphthalene-3-carboxylic acid it is transformed into 8-amino-2-hydroxynaphthalene-3-carboxylic acid which, when heated with hydrochloric acid under pressure or when diazotized and boiled, yields 2.8-dihydroxynaphthalene-3-carboxylic acid.

6. 1 mol. of monophosphoric acid ester of 2.3-hydroxynaphthoic acid, obtainable by causing phosphorus pentachloride to act on 2.3-hydroxynaphthoic acid, according to the statements in cf. Berichte der deutschen chemischen Gesellschaft, volume 26, [1893], page 668, and cautiously decomposing the reaction product with cold water with neutralization of the resultant mineral acid, is added while stirring at —20° C. to —10° C. to 2000 grams of concentrated sulfuric acid. 210 grams of a nitrating acid which contains 30 per cent. of nitric acid and 70 per cent. of sulfuric acid is caused to run in at —15° C. to 10° C. When the nitration is finished, the whole is poured into 10 liters of ice water and boiled for 3 hours in order to split off the radical of the phosphoric acid. The yellow nitration product obtained is filtered with suction and dried. It consists for the greatest part of a mixture of about equal parts of 5-nitro- and 8-nitro-2-hydroxynaphthalene-3-carboxylic acid.

In order to separate the crude mixture, part of it is boiled with 4 parts of alcohol while stirring for half an hour and then while hot filtered with suction. The residue consists for the greatest part of 8-nitro-2-hydroxynaphthalene-3-carboxylic acid. The alcoholic filtrate is concentrated by evaporation to about one third of the volume. On cooling, a nitrohydroxynaphthoic acid crystallizes which consists for the greatest part of 5-nitro-2-hydroxynaphthalene-3-carboxylic acid. It may be purified by way of the potassium salt or the sodium salt and crystallizes from acetic acid of 50 per cent. strength in the form of long yellow needles which melt at 260° C. with decomposition. In alcohol it is more easily soluble than 8-nitro-2-hydroxynaphthalene-3-carboxylic acid, and its sodium salt is more difficultly soluble in water than that of 8-nitro-2-hydroxynaphthalene-3-carboxylic acid. The methyl ester of 5-nitro-2-hydroxynaphthalene-3-carboxylic acid melts at 194° C.–196° C.; the 5-nitro-2-hydroxynaphthalene-3-carboxylic acid amide forms, when recrystallized from dioxane, yellow needles which, when heated to 220° C., partly melt together, but solidify when heated to higher temperatures and melt at 285° C.–288° C. while assuming a red coloration and decomposing.

5-nitro-2-hydroxynaphthalene-3-carboxylic acid yields, when coupled with diazotized o-nitraniline, an azo dyestuff which, on addition of mineral acid, assumes a fiery bluish-red color, whereas the corresponding azo dyestuff from 8-nitro-2-hydroxynaphthalene-3-carboxylic acid is yellowish-red in color.

7. 50 parts of nitric acid of 99 per cent. strength are caused to run in, while cooling, into 100 parts of glacial acetic acid and the mixture is then cooled to —15° C. 63 parts of 2-acetoxynaphthalene-3-carboxylic acid ethyl ester are then added, while stirring, and a mixture of 67 parts of glacial acetic acid and 100 parts of nitric acid of 99 per cent. strength are subsequently run in. The solution obtained is allowed to stand for 3 hours at —15° C. and for about 20 hours at 0° C. After this time, there begins slowly the separation of small quantities of dinitro derivatives which are not capable of being combined with diazo compounds and which are formed by a slow saponification of the acetyl group in the resultant nitro-2-acetoxynaphthalene-3-carboxylic acid ester and subsequent nitration. In order to separate these by-products, the nitration mixture is cooled to —20° C. and the precipitated crystals are filtered with suction. The solution is poured into ice water and the separated nitro-bodies are extracted with an aqueous solution of sodium bicarbonate. In this manner, there is obtained a mixture of various nitro derivatives of 2-acetoxynaphthalene-3-carboxylic acid ethyl ester. By boiling the crude product with a solution of sodium carbonate, there are saponified both the acetoxy group and the carboxylic acid ester group. There are obtained the corresponding nitrohydroxynaphthalene carboxylic acids from which there may be separated, as indicated in Example 5, after recrystallization from alcohol, 8-nitro-2-hydroxynaphthalene-3-carboxylic acid.

In order to saponify only the acetoxy group, 1 part of nitro-2-acetoxynaphthoic acid ester is dissolved in 10 parts of concentrated sulfuric acid at 0° C., the whole is allowed to stand for 2 hours at 20° C. and then poured on ice. The nitro-2-hydroxynaphthalene - 3 - carboxylic acid ester obtained yields, when coupled with diazotized o-nitraniline in diluted pyridine, an orange-yellow azo dyestuff, whereas the hydroxynaphthoic acid ester yields under the same conditions an orange-red azo dyestuff.

8. 229 parts of 2-acetoxynaphthalene-3-carboxylic acid amide are mixed with 101 parts of finely pulverized potassium nitrate and the mixture is added, while stirring, to 1800 parts of concentrated sulfuric acid at −20° C. to −10° C. After 4 hours, the mixture obtained is poured into 10,000 parts of ice water and filtered with suction. Thus, a mixture of various nitro derivatives of 2-acetoxynaphthalene-3-carboxylic acid amide is obtained which, by saponification with caustic soda solution are converted into a mixture of various nitro derivatives of 2-hydroxynaphthalene-3-carboxylic acid capable of being combined with diazo compounds.

By recrystallizing from alcohol, as indicated in Example 5, the nitrohydroxynaphthalene carboxylic acids, obtainable by alkaline saponification, there is obtained 8-nitro-2-hydroxynaphthalene-3-carboxylic acid of a decomposition point of 293° C.

By recrystallizing from glacial acetic acid the mixture of the nitro derivatives of 2-acetoxynaphthalene-3-carboxylic acid amide there is obtained a nitro-2-acetoxy-3-carboxylic acid amide which melts at 205° C. to 213° C. and dissolves very difficultly in alcohol. When dissolved in and precipitated from concentrated sulfuric acid or boiled with diluted ammonia, it is converted into the corresponding nitro-2-hydroxynaphthalene-3-carboxylic acid amide.

6 parts of nitro-2-acetoxynaphthalene-3-carboxylic acid amide are dissolved, while boiling, in 180 parts of water and 25 parts of ammonia of 25 per cent. strength. The ammonia in excess is distilled off, and the solution is cooled. The separated nitrohydroxynaphthoic acid amide crystallizes from glacial acetic acid and forms the same brown-yellow needles, united to clusters, as 8-nitro-2-hydroxynaphthalene - 3 - carboxylic acid amide, melting at 275° C. to 280° C. with decomposition.

9. 1 mol. of phosphoric acid ester of 6-bromo-2-hydroxy-naphthalene - 3 - carboxylic acid, obtainable by causing phosphorus pentachloride to act on 6-bromo-2-hydroxynaphthalene - 3 - carboxylic acid according to the statement of Example 6, is added while stirring to 5000 grams of concentrated sulfuric acid at −20° C. to −10° C. At −15° C. to −10° C., 210 grams of a nitrating acid which contains 30% of nitric acid and 70% of sulfuric acid is caused to run into the intensely yellow-colored thick magma obtained. The yellow precipitation dissolves to a greenish solution and then precipitates again slowly. The mixture is allowed to stand for 5 hours at −20° C. to −10° C., for 5 hours at 0° C. and for 10 hours at room temperature. The solution is then poured on 15 liters of ice water. There is obtained a nearly colorless precipitate which slowly becomes yellow on boiling. The whole is boiled, while stirring, for 10 hours in a reflux apparatus and the nitro-6-bromo-2-hydroxynaphthalene-3-carboxylic acid formed is filtered with suction.

After recrystallization from alcohol, it melts with decomposition at 290° C. and couples with diazotized o-nitraniline to form a dyestuff which is yellower in color than the corresponding dyestuff from 6-bromo-2-hydroxynaphthalene - 3 - carboxylic acid.

10. 1 mol. of phosphoric acid ester of 2-hydroxynaphthalene-3-carboxylic acid 8 - sulfochloride is added, while stirring, to 3000 parts of concentrated sulfuric acid at −15° C. 210 grams of a nitrating acid, mentioned in Example 9, are caused to run in and, after stirring for 5 hours at −10° C., the whole is poured on ice. In this manner, there is obtained the nitrated phosphoric acid ester which is soluble in water, but difficultly soluble in dilute mineral acid.

By cautiously heating with water, or better still by stirring with concentrated hydrochloric acid, the radical of the phosphoric acid is split off. Thus, a nitro derivative of 2-hydroxynaphthalene-3-carboxylic acid 8-sulfochloride is obtained in the form of a feebly yellow powder which is easily soluble in ether, alcohol, glacial acetic acid and ethyl acetate, but difficultly soluble in benzene.

By condensing the sulfochloride with dimethylamine, a dimethylamide is obtained which crystallizes from glacial acetic acid in the form of feebly yellow-colored crystals of a decomposition point of 270° C.–275° C. The sodium salt of this amide crystallizes from water in the form of long orange-yellow needles. When coupled with diazotized o-nitraniline and acidified, an orange-red dyestuff is obtained, whereas the non-nitrated dimethylamide of a melting point of 206° C. to 208° C. yields under the same conditions a blue-red dyestuff.

By treating the phosphoric acid ester of the sulfochloride or the sulfochloride with a sodium carbonate solution, there is obtained, after acidification with mineral acid, the sodium salt of nitro-8-sulfo-2-hydroxynaphthalene-3-carboxylic acid which crystallizes from water in the form of beautiful feebly yellow needles. It dissolves in water to a yellow solution, in sodium carbonate and caustic soda solution to an orange solution and assumes a red-brown coloration by addition of ferric chloride, whereas 8-sulfo-2-hydroxy-naphthalene-3-carboxylic acid becomes blue in color. The compound obtained yields, when coupled with diazotized m-nitraniline in a solution rendered alkaline by means of bicarbonate, an orange-yellow dyestuff, whereas 8-sulfo-2-hydroxynaphthalene-3-carboxylic acid yields a yellow-orange dyestuff.

The phosphoric acid ester of 2-hydroxynaphthalene-6-sulfochloride-3-carboxylic acid may be nitrated in the same manner.

The nitrated and saponified sulfochloride is obtained as a feebly yellow-colored powder which is easily soluble in alcohol and ethyl acetate to a yellow solution, dissolves nearly colorless in ether and is difficultly soluble in benzene and cold water.

The sodium sulfonate obtainable therefrom crystallizes from water in the form of long feebly yellow needles having a silky luster and yields an orange-yellow dyestuff when coupled with diazotized o-nitraniline in a solution rendered alkaline by means of sodium carbonate, whereas the dyestuff from 6-sulfo-2-hydroxynaphthalene-3-carboxylic acid is orange-red in color.

The nitrosulfonic acid assumes a Bordeaux red coloration on addition of ferric chloride, whereas the non-nitrated sulfonic acid becomes blue in color.

I claim:
1. The process which comprises nitrating 2- acyl-derivatives of 2-hydroxynaphthalene-3-carboxylic acid of the following formula:

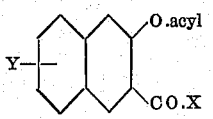

wherein X represents a member of the group consisting of hydroxy, alkoxy and amino groups and Y a member of the group consisting of hydrogen, alkoxy, alkyl, halogen and sulfonic acid groups.

2. The process which comprises nitrating 2-acyl-derivatives of 2-hydroxynaphthalene-3-carboxylic acid of the following formula:

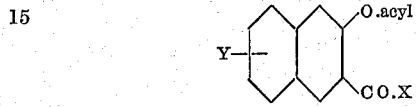

wherein X represents a member of the group consisting of hydroxy, alkoxy, and amino groups and Y a member of the group consisting of hydrogen, alkoxy, alkyl, halogen and sulfonic acid groups, and saponifying the nitro compounds thus obtained.

3. The process which comprises nitrating 2-acyl-derivatives of the 2-hydroxynaphthalene-3-carboxylic acid of the following formula:

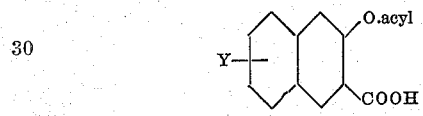

wherein Y represents a member of the group consisting of hydrogen, alkoxy, alkyl, halogen and sulfonic acid groups, and saponifying the nitro compounds thus obtained.

4. The compounds of the following general formula:

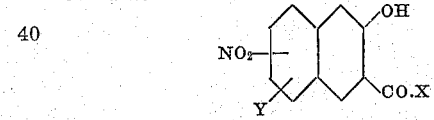

wherein the nitro group stands in one of the positions 5 and 8, X represents a member of the group consisting of hydroxy, alkoxy and amino groups and Y a member of the group consisting of hydrogen, alkoxy, alkyl, halogen and sulfonic acid groups, being yellow to orange colored products, capable of being combined with diazotized bases.

5. The compounds of the following general formula:

wherein the nitro group stands in one of the positions 5 and 8, and Y represents a member of the group consisting of hydrogen, alkoxy, alkyl, halogen and sulfonic acid groups, being yellow to orange colored products, soluble in aqueous alkalies, capable of being combined with diazotized bases.

6. The compound of the following general formula:

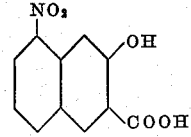

crystallizing from alcohol in the form of short needles of a decomposition point of 293° C. and yielding an orange-red azo dyestuff when coupled with diazotized o-nitraniline in sodium carbonate solution.

7. The compound of the following general formula:

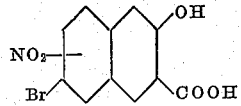

melting, when recrystallized from alcohol, at 290° C. with decomposition and yielding an orange-red azo dyestuff, when coupled with diazotized p-chloroaniline in sodium carbonate solution.

8. The compound of the following general formula:

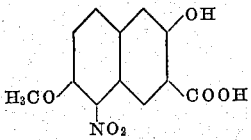

melting at 260° C. with violent decomposition and yielding a bright red azo dyestuff, when coupled with diazotized o-nitraniline in sodium carbonate solution.

WILHELM LUCE.